US010961928B2

(12) United States Patent
Ban et al.

(10) Patent No.: US 10,961,928 B2
(45) Date of Patent: Mar. 30, 2021

(54) CONTROL APPARATUS FOR INTERNAL COMBUSTION ENGINE AND METHOD FOR CONTROLLING INTERNAL COMBUSTION ENGINE

(71) Applicant: TOYOTA JIDOSHA KABUSHIKI KAISHA, Toyota (JP)

(72) Inventors: Misako Ban, Toyota (JP); Keiichi Myojo, Okazaki (JP); Yoshiyuki Shogenji, Toyota (JP); Yuki Nose, Kasugai (JP); Eiji Ikuta, Oobu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 135 days.

(21) Appl. No.: 16/140,794

(22) Filed: Sep. 25, 2018

(65) Prior Publication Data

US 2019/0101073 A1 Apr. 4, 2019

(30) Foreign Application Priority Data

Oct. 3, 2017 (JP) ............................ JP2017-193490

(51) Int. Cl.
*F02D 41/00* (2006.01)
*F02D 41/24* (2006.01)
(Continued)

(52) U.S. Cl.
CPC ....... *F02D 41/0042* (2013.01); *F02D 41/008* (2013.01); *F02D 41/0045* (2013.01);
(Continued)

(58) Field of Classification Search
CPC ............... F02D 41/0035; F02D 41/004; F02D 41/0042; F02D 41/0045; F02D 41/008;
(Continued)

(56) References Cited

U.S. PATENT DOCUMENTS 5,406,927 A * 4/1995 Kato .................. F02D 41/0045 123/674
5,462,039 A * 10/1995 Mamiya .............. F02D 41/1408 123/686
(Continued)

FOREIGN PATENT DOCUMENTS

JP 60182326 A * 9/1985 ......... F02D 41/0042
JP 07259615 A * 10/1995 ......... F02D 41/0045
(Continued)

*Primary Examiner* — John M Zaleskas
(74) *Attorney, Agent, or Firm* — Finnegan, Henderson, Farabow, Garrett & Dunner, LLP

(57) ABSTRACT

When a purge valve opens, a CPU calculates a purge concentration learning value based on an air-fuel ratio detected by an air-fuel ratio sensor. Additionally, under the condition that a temperature increase request of a three-way catalyst is generated, the CPU performs dither control that sets one of a plurality of cylinders as a rich combustion cylinder, which is richer than a theoretical air-fuel ratio, and the remaining cylinders as lean combustion cylinders, which are leaner than the theoretical air-fuel ratio. When the dither control is performed, the CPU forbids the update of the purge concentration learning value.

7 Claims, 4 Drawing Sheets

(51) Int. Cl.
*F02M 25/08* (2006.01)
*F02D 41/14* (2006.01)

(52) U.S. Cl.
CPC ..... *F02D 41/1475* (2013.01); *F02D 41/2448* (2013.01); *F02D 41/2458* (2013.01); *F02M 25/0836* (2013.01); *F02D 2200/06* (2013.01)

(58) Field of Classification Search
CPC ............... F02D 41/025; F02D 41/1408; F02D 41/2448; F02D 41/2458; F01N 2430/06
USPC .......................................................... 123/520
See application file for complete search history.

(56) References Cited

U.S. PATENT DOCUMENTS 5,720,256 A * 2/1998 Furuya ................ F02D 41/0045 123/339.12
5,778,867 A * 7/1998 Osanai .................. F02D 41/004 123/520
5,950,606 A * 9/1999 Iida ..................... F02D 41/0037 123/479
5,988,150 A * 11/1999 Osanai ................ F02D 41/0042 123/520
6,176,228 B1 * 1/2001 Kerns ................. F02D 41/0035 123/520
6,192,672 B1 * 2/2001 Kerns ................. F02D 41/0035 123/520
6,192,674 B1 * 2/2001 Kerns ................. F02D 41/0032 123/520
6,230,484 B1 * 5/2001 Kerns ................. F02D 41/0035 123/518
6,230,699 B1 * 5/2001 Mitsutani ............ F02D 41/0042 123/674
6,233,924 B1 * 5/2001 Kerns ................... F02B 23/104 123/520
6,237,328 B1 * 5/2001 Kerns ................. F02D 41/0035 123/520
6,311,482 B1 * 11/2001 Yamashita ............. B60K 6/485 60/284
6,343,467 B1 * 2/2002 Muto .................. F02D 41/0042 123/518
2004/0250534 A1 * 12/2004 Tanaka ................ F02D 41/0255 60/284
2005/0109318 A1 * 5/2005 Ichihara .............. F02D 41/0085 123/406.45
2007/0062505 A1 * 3/2007 Osanai ................. F02M 25/089 123/698
2009/0000276 A1 * 1/2009 Hokuto ............... F02D 41/1443 60/285
2010/0163008 A1 * 7/2010 Kato ................... F02D 41/1458 123/674
2011/0277451 A1 * 11/2011 Hoshino ............... F02P 5/1514 60/285
2011/0288739 A1 * 11/2011 Kidokoro ............ F02D 41/1454 701/99
2012/0006307 A1 * 1/2012 Demura .............. F02D 41/2454 123/674
2012/0185156 A1 * 7/2012 Iwazaki .............. F02D 41/0085 701/104
2013/0184972 A1 * 7/2013 Suzuki ................ F02D 41/1441 701/104
2013/0261934 A1 * 10/2013 Iwazaki .............. F02D 41/0085 701/103
2015/0337696 A1 * 11/2015 Glugla .................. F02D 41/003 123/574
2017/0122227 A1 * 5/2017 Rollinger ............ F02D 41/1498
2018/0058384 A1 * 3/2018 Dudar ................. F02D 41/0032
2019/0024603 A1 * 1/2019 Myojo ................ F02D 41/2458
2019/0048815 A1 * 2/2019 Myojo .................. F02D 41/025
2019/0048818 A1 * 2/2019 Suzuki ................ F02D 41/2454
2019/0128198 A1 * 5/2019 Ban ..................... F02D 41/0042

FOREIGN PATENT DOCUMENTS

JP 2004-218541 8/2004
JP 2007-162494 A 6/2007
JP 2012-021455 2/2012
JP 2012057492 A * 3/2012 ......... F02D 41/0042

* cited by examiner

CONTROL APPARATUS FOR INTERNAL COMBUSTION ENGINE AND METHOD FOR CONTROLLING INTERNAL COMBUSTION ENGINE

BACKGROUND ART

The present invention relates to a control apparatus for an internal combustion engine and a method for controlling an internal combustion engine.

An internal combustion engine may include an exhaust purifying device that purifies exhaust gases discharged from a plurality of cylinders, fuel injection valves disposed for each of the plurality of cylinders, a canister that collects fuel vapor in a fuel tank storing fuel injected by the fuel injection valves, and an adjuster that adjusts the flow rate of a fluid from the canister to an intake air passage. For example, Japanese Laid-Open Patent Publication No. 2004-218541 discloses a control apparatus for an internal combustion engine that performs a dither control process when a request is made to increase the temperature of a catalyst device (a catalyst). The dither control process sets the air-fuel ratio in some of a plurality of cylinders to be richer than a theoretical air-fuel ratio while setting the air-fuel ratio in the remaining cylinders to be leaner than the theoretical air-fuel ratio.

Japanese Laid-Open Patent Publication No. 2012-21455 discloses learning of the concentration of fuel vapor in a fluid based on an air-fuel ratio when the fluid is allowed to flow from a canister to an intake air passage.

When dither control is performed, a detection value of an air-fuel ratio detected by an air-fuel ratio sensor may deviate from the actual air-fuel ratio. In such a case, it is difficult to distinctively determine whether the deviation of the detection value of the air-fuel ratio is caused by the concentration of the fuel vapor or by dither control. Therefore, when the concentration of the fuel vapor is learned based on the detection value of the air-fuel ratio while dither control is performed, the accuracy of learning may be lowered.

SUMMARY OF THE INVENTION

To solve the above problem, a first aspect of the present invention provides a control apparatus for an internal combustion engine including an exhaust purifying device that purifies an exhaust gas discharged from a plurality of cylinders, a fuel injection valve provided for each of the plurality of cylinders, a canister that collects fuel vapor in a fuel tank, which stores fuel injected by the fuel injection valves, and an adjusting device that adjusts a flow rate of a fluid from the canister to an intake air passage. The control apparatus is configured to perform a dither control process that operates the fuel injection valves so that at least one of the plurality of cylinders is set as a lean combustion cylinder, which has an air-fuel ratio that is leaner than a theoretical air-fuel ratio, and so that at least a further one of the plurality of cylinders is set as a rich combustion cylinder, which has an air-fuel ratio that is richer than the theoretical air-fuel ratio; a purge control process that operates the adjusting device to control the flow rate of the fluid from the canister to the intake air passage; an update process that updates a learning value of a concentration of fuel vapor in the fluid based on a detection value of the air-fuel ratio; and a limit process that limits a change in the learning value updated by the update process to a smaller side in a second period during which the dither control process is performed than in a first period during which the dither control process is not performed.

To solve the above problem, a second aspect of the present invention provides a control apparatus for an internal combustion engine including an exhaust purifying device that purifies an exhaust gas discharged from a plurality of cylinders, a fuel injection valve provided for each of the plurality of cylinders, a canister that collects fuel vapor in a fuel tank, which stores fuel injected by the fuel injection valves, and an adjusting device that adjusts a flow rate of a fluid from the canister to an intake air passage. The control apparatus includes a circuit that performs a dither control process that operates the fuel injection valves so that at least one of the plurality of cylinders is set as a lean combustion cylinder, which has an air-fuel ratio that is leaner than a theoretical air-fuel ratio, and so that at least a further one of the plurality of cylinders is set as a rich combustion cylinder, which has an air-fuel ratio that is richer than the theoretical air-fuel ratio; a purge control process that operates the adjusting device to control the flow rate of the fluid from the canister to the intake air passage; an update process that updates a learning value of a concentration of fuel vapor in the fluid based on a detection value of the air-fuel ratio; and a limit process that limits a change in the learning value updated by the update process to a smaller side in a second period during which the dither control process is performed than in a first period during which the dither control process is not performed.

To solve the above problem, a third aspect of the present invention provides a method for controlling an internal combustion engine including an exhaust purifying device that purifies an exhaust gas discharged from a plurality of cylinders, a fuel injection valve provided for each of the plurality of cylinders, a canister that collects fuel vapor in a fuel tank, which stores fuel injected by the fuel injection valves, and an adjusting device that adjusts a flow rate of a fluid from the canister to an intake air passage. The method includes operating the fuel injection valves so that at least one of the plurality of cylinders is set as a lean combustion cylinder, which has an air-fuel ratio that is leaner than a theoretical air-fuel ratio, and so that at least a further one of the plurality of cylinders is set as a rich combustion cylinder, which has an air-fuel ratio that is richer than the theoretical air-fuel ratio; operating the adjusting device to control the flow rate of the fluid from the canister to the intake air passage; updating a learning value of a concentration of fuel vapor in the fluid based on a detection value of the air-fuel ratio; and limiting a change in the learning value updated by the update process to a smaller side in a second period during which the dither control process is performed than in a first period during which the dither control process is not performed.

DESCRIPTION OF THE EMBODIMENTS

First Embodiment

A first embodiment according to a control apparatus for an internal combustion engine will be hereinafter described with reference to the drawings.

Figure 1:
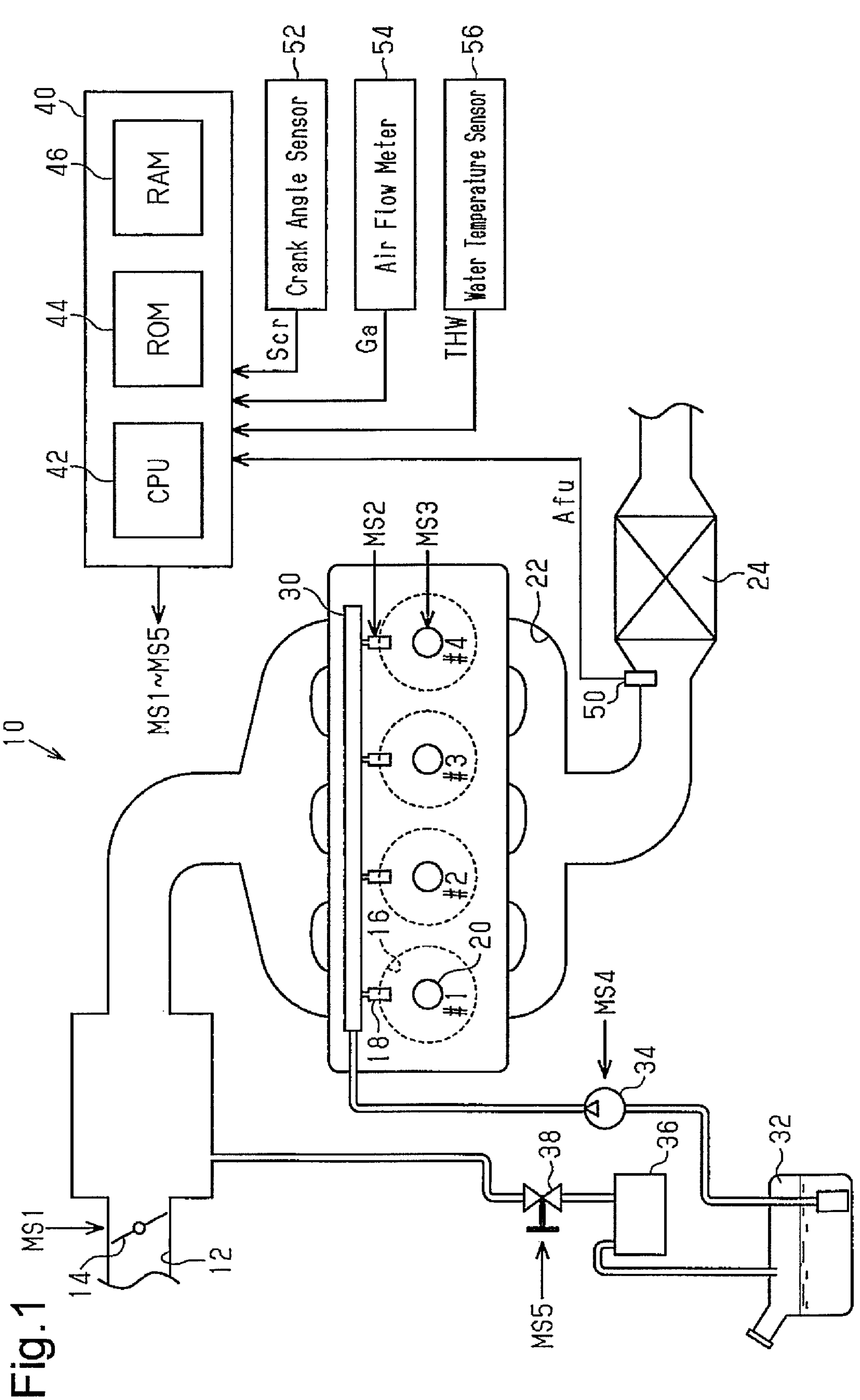
FIG. 1 is a schematic diagram showing a control apparatus for an internal combustion engine and the internal combustion engine according to a first embodiment.

FIG. 1 shows an internal combustion engine 10 in which air is taken in from an intake air passage 12 and flows through a throttle valve 14 into a combustion chamber 16 of each cylinder. The combustion chamber 16 is provided with a fuel injection valve 18 that injects fuel and an ignition device 20 that generates spark discharge. The air and fuel mix together and become an air-fuel mixture in the combustion chamber 16. The air-fuel mixture burns in the combustion chamber 16. The burned air-fuel mixture is discharged into an exhaust passage 22 as exhaust gas. The exhaust passage 22 is provided with a three-way catalyst 24 that is capable of storing oxygen.

The fuel injection valve 18 injects fuel in a delivery pipe 30. The fuel stored in a fuel tank 32 is drawn by means of a fuel pump 34 and supplied to the delivery pipe 30. Part of the fuel stored in the fuel tank 32 is vaporized and becomes fuel vapor. The fuel vapor is collected by a canister 36. The fuel vapor collected by the canister 36 flows into the intake air passage 12 through a purge valve 38. The purge valve 38 is configured so that the opening degree is electronically operable.

A control apparatus 40 controls the internal combustion engine 10. In order to control the control amount of torque, exhaust components, or the like generated in the internal combustion engine 10, the control apparatus 40 operates operating portions of the internal combustion engine 10, such as the throttle valve 14, the fuel injection valve 18, the ignition device 20, the fuel pump 34, and the purge valve 38. The control apparatus 40 refers to an air-fuel ratio Afu detected by an air-fuel ratio sensor 50 at the upstream side of the three-way catalyst 24, an output signal Scr of a crank angle sensor 52, an intake air amount Ga detected by an air flow meter 54, and the temperature (water temperature THW) of cooling water of the internal combustion engine 10 detected by a water temperature sensor 56. The control apparatus 40 includes a CPU 42, a ROM 44, and a RAM 46. The CPU 42 executes a program stored in the ROM 44. Consequently, the control amount is controlled.

Figure 2:
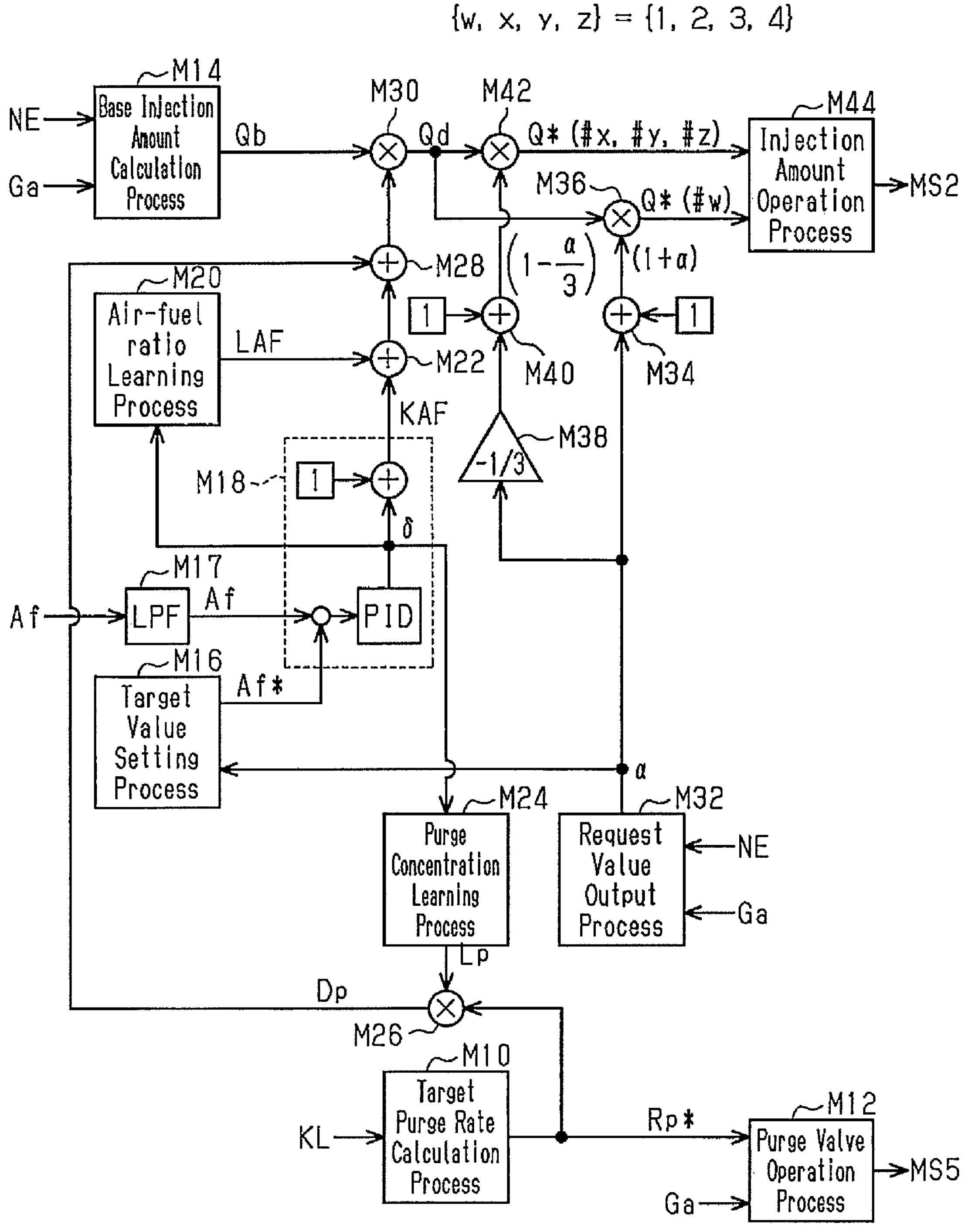
FIG. 2 is a block diagram showing part of a process performed by the control apparatus.

FIG. 2 shows part of a process that is realized when the CPU 42 executes a program stored in the ROM 44. A target purge rate calculation process M10 calculates a target purge rate Rp* based on a load factor KL. The purge rate is a value obtained by dividing the flow rate of a fluid that flows into the intake air passage 12 from the canister 36 by the intake air amount Ga. The target purge rate Rp* is a target value of a purge rate for control. The load factor KL is a parameter indicating the amount of air filled in the combustion chamber 16. The CPU 42 calculates the load factor KL based on the intake air amount Ga. The load factor KL is a ratio of the amount of incoming air per combustion cycle of one cylinder to a reference incoming air amount. The reference incoming air amount is the amount of incoming air per combustion cycle of one cylinder when the opening degree of the throttle valve 14 is maximized. The reference incoming air amount may be variably set in accordance with a rotation speed NE. The CPU 42 calculates the rotation speed NE based on an output signal Scr that is output from the crank angle sensor 52.

A purge valve operation process M12 outputs an operation signal MS5 to the purge valve 38 so that the purge rate reaches the target purge rate Rp* based on the intake air amount Ga. Additionally, the purge valve operation process M12 decreases the opening degree of the purge valve 38 as the intake air amount Ga decreases when the target purge rate Rp* is the same. As the intake air amount Ga decreases, the pressure in the canister 36 is increased as compared to the pressure in the intake air passage 12, and the fluid more easily flows from the canister 36 to the intake air passage 12. Therefore, in order to keep the target purge rate Rp* constant, the opening degree of the purge valve 38 needs to be decreased as the intake air amount Ga decreases.

A base injection amount calculation process M14 calculates a base injection amount Qb, which is used as an open-loop operation amount, based on the rotation speed NE and the intake air amount Ga. The base injection amount Qb is an operation amount used in open-loop control so that the air-fuel ratio of an air-fuel mixture in the combustion chamber 16 reaches a target air-fuel ratio.

A target value setting process M16 sets a target value Af* of a feedback control amount so that the air-fuel ratio of an air-fuel mixture in the combustion chamber 16 is controlled to reach a target air-fuel ratio. A low-pass filter M17 performs a low-pass filter process on an air-fuel ratio Afu detected by the air-fuel ratio sensor 50 and outputs the air-fuel ratio Af. The air-fuel ratio Af is a parameter that expresses a time average value of an air-fuel ratio Afu per combustion cycle.

A feedback process M18 calculates a feedback operation amount KAF, which is an operation amount for feedback control so that the air-fuel ratio Af, which is a feedback control amount, reaches the target value Af*. The feedback operation amount KAF is a correction factor of a base injection amount Qb and is expressed as "1+δ." When the correction rate δ is zero, the correction rate of the base injection amount Qb is zero. When the correction rate δ is greater than zero, the base injection amount Qb undergoes an increase correction. When the correction rate δ is less than zero, the base injection amount Qb undergoes a decrease correction. In the present embodiment, the correction rate —5 is set to the sum of the output value of a proportional element, the output value of an integral element, and the output value of a differentiating element, whose input is a difference between the target value Af* and the air-fuel ratio Af.

An air-fuel ratio learning process M20 successively updates an air-fuel ratio learning value LAF so that the deviation of the correction rate δ from zero is decreased in an air-fuel ratio learning period. The air-fuel ratio learning process M20 includes a process for determining that the air-fuel ratio learning value LAF has converged when the deviation amount of the correction rate δ from zero is less than or equal to a predetermined value.

A factor addition process M22 adds the air-fuel ratio learning value LAF to the feedback operation amount KAF. A purge concentration learning process M24 calculates a purge concentration learning value Lp based on the correction rate δ. The purge concentration learning process M24 and the purge concentration learning value Lp will be described later in detail.

A purge correction rate calculation process M26 calculates a purge correction rate Dp by multiplying the target purge rate Rp* by the purge concentration learning value Lp.

A correction factor calculation process M28 adds the purge correction rate Dp to an output value that is output from the factor addition process M22. A request injection amount calculation process M30 corrects the base injection amount Qb to calculate a request injection amount Qd by multiplying the base injection amount Qb by an output value that is output from the correction factor calculation process M28.

A request value output process M32 calculates and outputs an injection amount correction request value α of dither control. In dither control, the fuel is injected so that components of the entirety of exhaust gases discharged from cylinders #1 to #4 of the internal combustion engine 10 are made equivalent to those of when the air-fuel ratio of an air-fuel mixture burned in all of the cylinders #1 to #4 is assumed as the target air-fuel ratio and so that the air-fuel ratio of an air-fuel mixture, which is subject to burning, differs between cylinders. In the dither control according to the present embodiment, one of the first to fourth cylinders #1 to #4 is set to be a rich combustion cylinder in which the air-fuel ratio of the air-fuel mixture is richer than the theoretical air-fuel ratio, and each of the remaining three cylinders is set to be a lean combustion cylinder in which the air-fuel ratio of the air-fuel mixture is leaner than the theoretical air-fuel ratio. Additionally, the injection amount of a rich combustion cylinder is set to be "1+α" times greater than the request injection amount Qd, and the injection amount of a lean combustion cylinder is set to be "1−(α/3)" times greater than the request injection amount Qd. When the above injection amounts are respectively set for the lean combustion cylinder and the rich combustion cylinder, if the same amount of air is filled in each of the cylinders #1 to #4, components of the entirety of exhaust gases discharged from the cylinders #1 to #4 are made equivalent to those of when the air-fuel ratio of an air-fuel mixture burned in all of the cylinders #1 to #4 is assumed as the target air-fuel ratio. Additionally, when the same amount of air is filled in each of the cylinders #1 to #4, the target air-fuel ratio is the inverse of an average value of a fuel-air ratio of the air-fuel mixture burned in the cylinders. The fuel-air ratio is the inverse of the air-fuel ratio.

The target air-fuel ratio is set to the inverse of an average value of a fuel-air ratio so that exhaust components are desirably controlled. Hereinafter, an exhaust air-fuel ratio is referred to as a theoretical air-fuel ratio when unburnt fuel components in exhaust gases and oxygen react with each other without any deficiency and excess. As unburnt fuel components in exhaust gases increase from an amount that reacts with oxygen without any deficiency and excess, the exhaust air-fuel ratio is referred to as being richer. As unburnt fuel components in exhaust gases decrease from the amount that reacts with oxygen without any deficiency and excess, the exhaust air-fuel ratio is referred to as being leaner. Additionally, the average value of an exhaust air-fuel ratio per combustion cycle is defined as an exhaust air-fuel ratio of the entirety of exhaust gases discharged from the cylinders #1 to #4.

When a warm-up request of the three-way catalyst 24 is made or when a request is made to execute a process that removes sulfur deposited on the three-way catalyst 24, the request value output process M32 outputs a value that is greater than zero as the injection amount correction request value α. The warm-up request of the three-way catalyst 24 is made when the logical conjunction of condition (a) and condition (b) is true. Condition (a) is that the integrated value InGa of the intake air amount Ga from the start of the internal combustion engine 10 is greater than or equal to a first specified value Inth1. Condition (b) is that the integrated value InGa is less than or equal to a second specified value Inth2 and that the water temperature THW is lower than or equal to a predetermined temperature THWth. Condition (a) is used to determine that the temperature of an upstream-side end of the three-way catalyst 24 is an activating temperature. Condition (b) is used to determine that the entirety of the three-way catalyst 24 is not yet in an active state. The execution request of the sulfur removal process is made when the amount of sulfur deposited on the three-way catalyst 24 is greater than or equal to a predetermined value. In this case, the sulfur deposition amount may be calculated as follows. For example, as the rotation speed NE increases and the load factor KL increases, the deposition amount may be calculated at higher increase rates, and the increase rates may be accumulated. However, when the dither control is performed, the increase rate of the deposition amount is lowered as compared to when the dither control is not performed.

In detail, the request value output process M32 includes a process that variably sets the injection amount correction request value α based on the rotation speed NE and based on the load factor KL. More specifically, map data that specifies the relationship between the rotation speed NE and the load factor KL, both of which are input variables, and the injection amount correction request value α, which is an output variable, is stored in advance in the ROM 44. Thereafter, the CPU 42 may perform a map calculation of the injection amount correction request value α by use of the map data. The map is combination data of discrete values of input variables and values of output variables that respectively correspond to values of input variables. In the map calculation, a value of an output variable corresponding to any one of the values of the input variables of the map data may be used as a calculation result. If there is no match for any value of the input variables of the map data, a value obtained by interpolating values of output variables in the map may be used as a calculation result.

The correction factor calculation process M34 calculates a correction factor of the request injection amount Qd related to a rich combustion cylinder by adding the injection amount correction request value α to one. A dither correction process M36 calculates an injection amount command value Q* of a cylinder #w, which is set as a rich combustion cylinder by multiplying the request injection amount Qd by correction factor "1+α." Here, "w" denotes any one of one to four.

A multiplication process M38 multiplies the injection amount correction request value α by "−⅓." The correction factor calculation process M40 calculates a correction factor of the request injection amount Qd related to a lean combustion cylinder by adding an output value that is output from the multiplication process M38 to one. The dither correction process M42 calculates injection amount command values Q* of cylinders #x, #y, and #z, which are set as lean combustion cylinders by multiplying the request injection amount Qd by the correction factor "1−(α/3)." Each of "x," "y," and "z" is any one of one to four, and "w," "x," "y," and "z" differ from each other. Preferably, the rich combustion cylinder, which is any one of the cylinders #1 to #4, is changed in a cycle that is longer than one combustion cycle.

An injection amount operation process M44 generates an operation signal MS2 of the fuel injection valve 18 of the cylinder #w, which is set as a rich combustion cylinder, based on the injection amount command value Q* obtained by the dither correction process M36 and outputs the operation signal MS2 to the fuel injection valve 18. Additionally, the injection amount operation process M44 generates an operation signal MS2 of the fuel injection valve 18 of each of the cylinders #x, #y, and #z, which are set as lean combustion cylinders, based on the injection amount command value Q* obtained by the dither correction process M42 and outputs the operation signal MS2 to the fuel injection valve 18. In other words, the injection amount operation process M44 operates the fuel injection valve 18 so that the amount of fuel injected from the fuel injection valve 18 reaches an amount corresponding to the injection amount command value Q*.

The target value setting process M16 sets the target value Af* to a rich-side value when the dither control is performed as compared to when the dither control is not performed. This process is performed based on the consideration that when the dither control is performed, as the injection amount correction request value α increases, the air-fuel ratio Af deviates from an average value of exhaust air-fuel ratios of all cylinders #1 to #4 toward the rich side.

Figure 3:
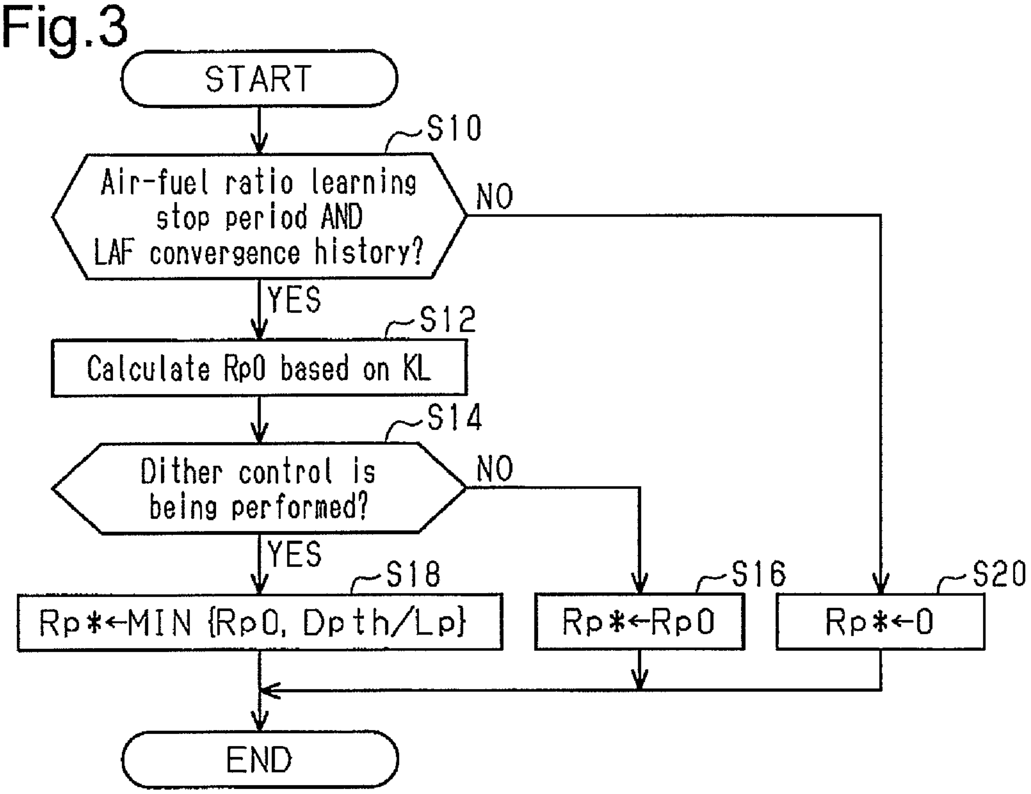
FIG. 3 is a flowchart showing the procedures for a target purge rate calculation process.

FIG. 3 shows the procedures for the target purge rate calculation process M10. The process shown in FIG. 3 is realized when the CPU 42 repeatedly executes a program stored in the ROM 44 in a predetermined cycle. Hereinafter, the step number is represented by a numeral provided with "S" in front.

As shown in FIG. 3, the CPU 42 first determines whether the logical conjunction of a state in which it is an air-fuel ratio learning stop period and state in which there is a history showing that the air-fuel ratio learning value LAF has converged after starting the internal combustion engine 10 is true (S10). This process is preformed to determine whether the target purge rate Rp* can be set to a value that is greater than zero. If the logical conjunction is true (S10: YES), the CPU 42 calculates a request purge rate Rp0 based on the load factor KL (S12). Herein, for example, when the load factor KL is small, the CPU 42 sets the request purge rate Rp0 to a smaller value than when the load factor KL is large. This avoids a situation in which the request injection amount Qd is less than a minimum injection amount of the fuel injection valve 18. This process is realized as follows. For example, map data that specifies the relationship between the load factor KL, which is an input variable, and the request purge rate Rp0, which is an output variable, is stored in advance in the ROM 44. Thereafter, the CPU 42 may perform a map calculation of the request purge rate Rp0 by use of the map data.

Thereafter, the CPU 42 determines whether the dither control is being performed (S14). If the dither control is not being performed (S14: NO), the CPU 42 assigns the request purge rate Rp0 to the target purge rate Rp* (S16). If the dither control is being performed (S14: YES), the CPU 42 assigns the smaller one of a value obtained by dividing a purge-correction upper limit Dpth by the purge concentration learning value Lp and the request purge rate Rp0 to the target purge rate Rp* (S18). The purge-correction upper limit Dpth limits the upper limit of the absolute value of the purge correction rate Dp. Both the purge-correction upper limit Dpth and the purge concentration learning value Lp are negative, and therefore "Dpth/Lp" has a positive value. The process of S18 is performed to avoid a situation in which a value obtained by dividing the flow rate of fuel vapor flowing into the intake air passage 12 from the canister 36 by the intake air amount Ga is excessively large.

If the logical conjunction is untrue (S10: NO), the CPU 42 assigns zero to the target purge rate Rp* (S20). When the processes of S16, S18, and S20 are completed, the CPU 42 temporarily ends the series of processes shown in FIG. 3.

Figure 4:
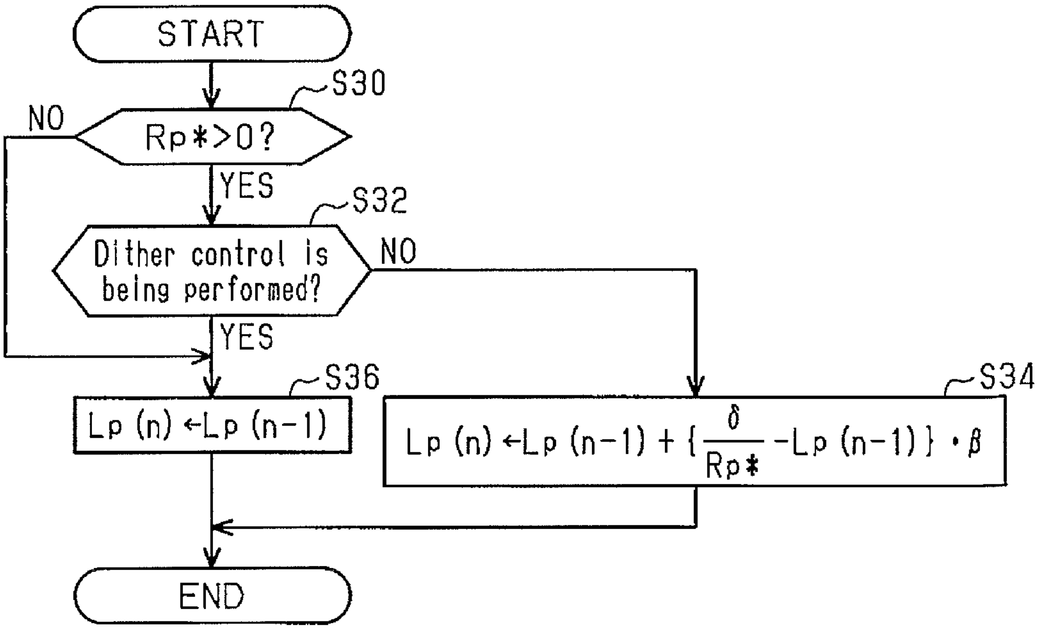
FIG. 4 is a flowchart showing the procedures for a purge concentration learning process.

FIG. 4 shows the procedures for the purge concentration learning process M24. The process shown in FIG. 4 is realized when the CPU 42 repeatedly executes a program stored in the ROM 44 in a predetermined cycle under a condition that the correction rate δ is smaller than zero.

As shown in FIG. 4, the CPU 42 first determines whether the target purge rate Rp* is greater than zero (S30). If the target purge rate Rp* is greater than zero (S30: YES), the CPU 42 determines whether the dither control is being performed (S32). The processes of S30 and S32 are performed to determine whether the condition for executing an update process of the purge concentration learning value Lp is satisfied. If the dither control is not being performed (S32: NO), the CPU 42 performs the update process of the purge concentration learning value Lp (S34). In the present embodiment, it is considered that when the target purge rate Rp* is greater than zero, the deviation of the feedback operation amount KAF from one is entirely caused by fuel vapor that has entered the intake air passage 12 from the canister 36. In other words, when entrance of the fuel vapor into the intake air passage 12 from the canister 36 causes the base injection amount Qb to deviate from an injection amount that is needed to perform control to reach the target air-fuel ratio, the correction rate δ is considered as a correction rate for correcting the deviation. However, the correction rate δ depends on the purge rate. Thus, the purge concentration learning value Lp is set to a value per percentage of the purge rate denoted by "δ/Rp*."

In detail, the present purge concentration learning value Lp(n) is set to an exponential moving average value of the last purge concentration learning value Lp(n−1) and the correction rate per percentage of the purge rate "δ/Rp*" More specifically, the CPU 42 assigns a value obtained by adding the last purge concentration learning value Lp(n−1) to a product of the factor β and a value obtained by subtracting the last purge concentration learning value Lp(n−1) from the correction rate per percentage of the purge rate "δ/Rp*" to the present purge concentration learning value Lp(n). The factor β is greater than zero and is less than one. A case in which the target purge rate Rp* is greater than zero corresponds to a state in which the air-fuel ratio learning value LAF is converged. Thus, the correction rate δ is normally set to reduce the base injection amount Qb in accordance with the amount of fuel vapor. Therefore, the correction rate δ is less than zero. Accordingly, the purge concentration learning value Lp is less than zero.

If a negative determination is made in S30 or if an affirmative determination is made in S32, the CPU 42 forbids an update of the purge concentration learning value Lp (S36). FIG. 4 shows a process for forbidding the update of the purge concentration learning value Lp by assigning the last purge concentration learning value Lp(n−1) to the present purge concentration learning value Lp(n). When the processes of S34 and S36 are completed, the CPU 42 temporarily ends the series of processes shown in FIG. 4.

Next, the operation of the present embodiment will be described.

Figure 5:
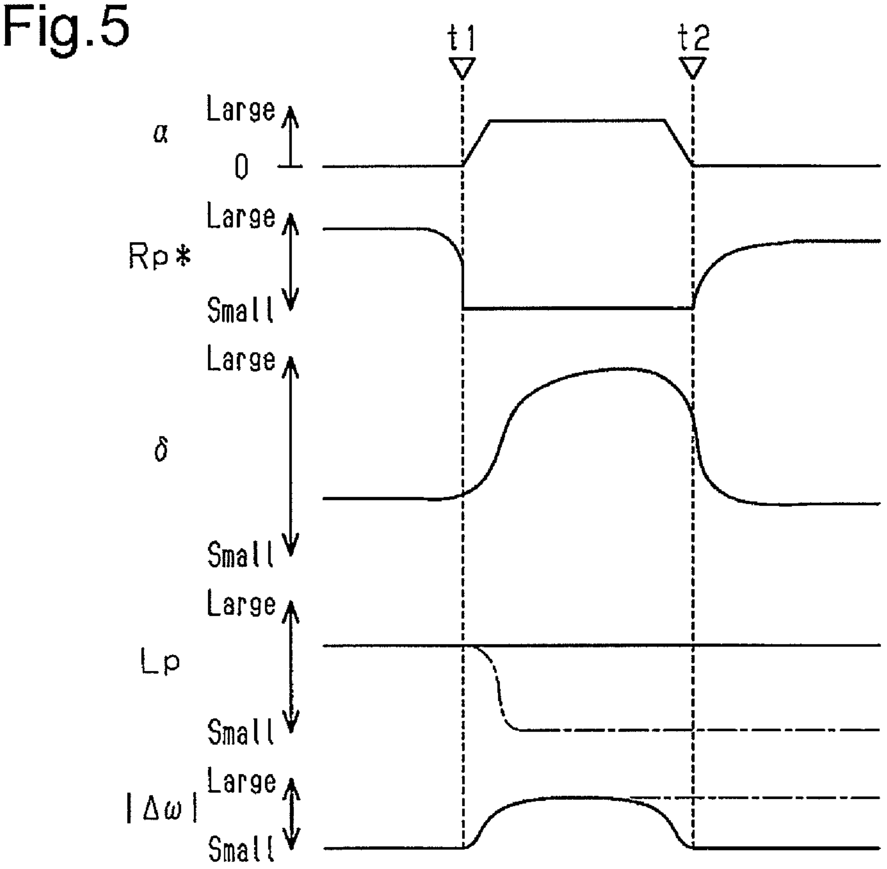
FIG. 5 is a time chart showing effects of the first embodiment.

FIG. 5 respectively shows the injection amount correction request value α, the target purge rate Rp*, the correction rate δ, the purge concentration learning value Lp, and the absolute value of a rotation variation amount Δω. Herein, the rotation variation amount Δω is a parameter that quantifies a deterioration degree of combustion. In other words, in view of the rotation speed (instantaneous rotation speed ω) at a predetermined angular interval including only one compression top dead center, the rotation variation amount Δω is a value obtained, between two cylinders in which compression top dead centers are reached one after the other in terms of a time series, by subtracting the rotation speed of one of the two cylinders that later reaches the compression top dead center from the rotation speed of the other cylinder that first reaches the compression top dead center. When combustion deterioration occurs and a torque decreases, the rotation variation amount Δω has a negative value, and its absolute value is large.

As shown in FIG. 5, at time t1, the CPU 42 increases the injection amount correction request value α from zero to start dither control. In this case, the absolute value of the correction rate δ greatly changes from the value obtained before the dither control is started. This is because there is a possibility that a target value Af* set by the target value setting process M16 includes an error when the dither control is performed. More specifically, the target value setting process M16 sets the target value Af* to a rich-side value in comparison with the target air-fuel ratio by performing feedforward control in consideration that the dither control causes the air-fuel ratio Af to deviate toward the rich side. However, the target value Af* set in this way has a possibility of including an error. In other words, there is a possibility that the target value Af* is set to a value that is deviated from an actual air-fuel ratio Af obtained when an average value of the exhaust air-fuel ratio reaches the target air-fuel ratio by performing the dither control. Therefore, even when the amount of air filled in the combustion chamber 16 remains the same, there is a possibility that the air-fuel ratio Af deviates from the target value Af* by performing the dither control depending on the request injection amount Qd obtained before the dither control is performed.

Additionally, when the dither control is performed, a torque generated by a lean combustion cylinder is slightly smaller than a torque generated by a rich combustion cylinder. Thus, the absolute value of the rotation variation amount Δω increases.

According to the present embodiment, when the dither control is started, the CPU 42 stops the update of the purge concentration learning value Lp. In other words, while the dither control is performed, the CPU 42 does not update the purge concentration learning value Lp. As a result, at time t2 at which the dither control is ended, the purge correction rate Dp calculated from the purge concentration learning value Lp indicates, with a relatively high accuracy, an excess rate of the base injection amount Qb with respect to the amount needed to control the air-fuel ratio so as to reach the target air-fuel ratio. The injection amount command value Q* is calculated by use of the request injection amount Qd calculated based on the purge correction rate Dp. This allows the absolute value of the rotation variation amount Δω to swiftly decrease after the dither control is ended.

The single-dashed lines shown in FIG. 5 represent a case in which the update process of the purge concentration learning value Lp is not stopped. In this case, the absolute value of the rotation variation amount Δω continues to be large even after the dither control is ended. This is because, when the purge concentration learning value Lp continues to be updated while the dither control is performed, the purge correction rate Dp largely deviates from an excess rate of the base injection amount Qb with respect to the amount needed to control the air-fuel ratio so as to reach the target air-fuel ratio. Thus, the absolute value of the rotation variation amount Δω is larger in a period until the feedback operation amount KAF converges on a value appropriate for correcting the base injection amount Qb.

As described above, the first embodiment has the following effects.

(1) When the purge correction rate Dp is used as a feedforward operation amount that is an operation amount of feedforward control, if the purge correction rate Dp is accurate, the controllability of injection amounts is improved. In the present embodiment, the purge correction rate Dp is calculated based on the purge concentration learning value Lp. Thus, when the accuracy of the purge concentration learning value Lp is low, the accuracy of the purge correction rate Dp is also lowered. The accuracy of the purge concentration learning value Lp is lowered by the effect of the dither control process. This lowers the accuracy of the purge correction rate Dp. Therefore, after the dither control process is stopped, a normal operation process tends to have a lower controllability of the injection amount.

In this point, in the present embodiment, when dither control is performed, the target purge rate Rp* is limited to a smaller value than when dither control is not performed. This lowers the level of deviation of the air-fuel ratio of each cylinder from the target value caused by uneven distribution of fuel vapor to the plurality of cylinders. Thus, the tendency of combustion deterioration caused by the dither control is limited.

(2) When fuel vapor flows into the intake air passage 12 from the canister 36, the base injection amount Qb becomes excessive with respect to the amount needed to control the air-fuel ratio so as to reach the target air-fuel ratio. In this case, the feedback operation amount KAF is a value for a decrease correction of the base injection amount Qb. Additionally, when the fuel vapor flowing into the intake air passage 12 from the canister 36 has a high concentration, the excess level of the base injection amount Qb is higher than when the fuel vapor flowing into the intake air passage 12 from the canister 36 has a low concentration. In other words, the decrease correction rate of the base injection amount Qb by the feedback operation amount KAF is increased. In this point, in the present embodiment, when the decrease correction rate of the base injection amount Qb by the feedback operation amount KAF is large, the purge concentration learning value Lp is updated to a greater value than when the decrease correction rate of the base injection amount Qb by the feedback operation amount KAF is small. This limits a situation in which the base injection amount Qb is excessive with respect to the amount needed to control the air-fuel ratio so as to reach the target air-fuel ratio.

Second Embodiment

A second embodiment will be hereinafter described with reference to the drawings focusing on the differences from the first embodiment.

In the first embodiment, the purge concentration learning value Lp is forbidden to be updated when dither control is performed. In the second embodiment, when dither control is performed, the update process of the purge concentration learning value Lp continues to be performed. However, in a case in which the difference between "δ/Rp*" and the purge concentration learning value Lp is the same, the amount of change per control cycle in the purge concentration learning value Lp in the update process is set to be smaller than when dither control is not performed.

Figure 6:
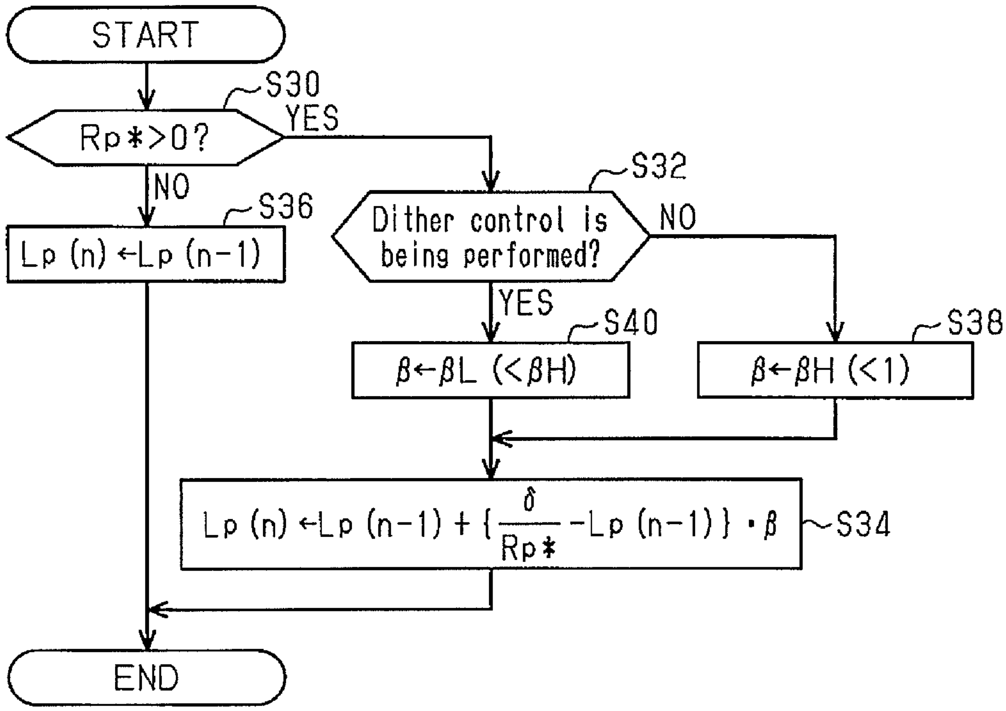
FIG. 6 is a flowchart showing the procedures for the purge concentration learning process according to a second embodiment.

FIG. 6 shows the procedures for the purge concentration learning process M24. The process of FIG. 6 is realized when the CPU 42 repeatedly executes a program stored in the ROM 44 in a predetermined cycle under a condition that, for example, the correction rate δ is smaller than zero. In FIG. 6, the same step numbers are given to those steps corresponding to the steps in FIG. 4.

As shown in FIG. 6, when dither control is not performed (S32: NO), the CPU 42 assigns a normal value pH to the factor β (S38). When dither control is performed (S32: YES), the CPU 42 assigns a limit value βL that is smaller than the normal value βH to the factor β (S40). Thereafter, when the processes of S38 and S40 are completed, the CPU 42 proceeds to the process of S34.

As described above, the second embodiment has the following effects.

(1) While dither control is performed, if the update of the purge concentration learning value Lp is forbidden regardless of the concentration of fuel vapor in the canister 36 being greatly increased, a reliable purge concentration learning value Lp cannot be obtained. In this point, according to the present embodiment, the purge concentration learning value Lp is allowed to be updated even when dither control is performed. Additionally, when dither control is performed, a change per cycle (per unit time) in the purge concentration learning value Lp of the series of processes shown in FIG. 6 is limited to a smaller change than when dither control is not performed. Thus, when dither control is not performed, the purge concentration learning value Lp will not greatly deviate from an appropriate value. Further, the purge concentration learning value Lp is allowed to be updated while dither control is performed. Thus, while dither control is performed, even when the concentration of fuel vapor in the canister 36 greatly changes, the purge correction rate Dp will not greatly deviate from an appropriate value.

Correspondence Relationship

A correspondence relationship between articles of the above embodiments and articles of the appended claims is as follows.

In claim 1, an adjusting device corresponds to the purge valve 38. A dither control process corresponds to the request value output process M32, the correction factor calculation process M34, the dither correction process M36, the multiplication process M38, the correction factor calculation process M40, the dither correction process M42, and the injection amount operation process M44 when the injection amount correction request value α is greater than zero. A purge control process corresponds to the target purge rate calculation process M10 and the purge valve operation process M12. An update process corresponds to the process of S34, and a limit process corresponds to the process of S36 when an affirmative determination is made in S32 of FIG. 4 and the process of S40 of FIG. 6.

In claim 2, a decrease correction amount calculation process corresponds to the purge correction rate calculation process M26. A normal operation process corresponds to the injection amount operation process M44 that receives the request injection amount Qd as an input when the injection amount correction request value α is zero. Claim 4 corresponds to the process of S36 when an affirmative determination is made in S32 of FIG. 4. Claim 5 corresponds to the process of S40.

Each of the above embodiments may be modified as follows.

In the above embodiment, the product of the purge concentration learning value Lp and the target purge rate Rp* is used as the purge correction rate Dp, which corresponds to a decrease correction amount. Instead, the product of a prediction purge rate that belatedly follows the target purge rate Rp* and the purge concentration learning value Lp may be used as the purge correction rate Dp in consideration of a response delay until the operation of the purge valve 38 by the purge valve operation process M12 reflects the air-fuel ratio of an air-fuel mixture in the combustion chamber 16.

In the process of FIG. 6, if "δ/Rp*−Lp(n−1)" is the same, when dither control is performed, the absolute value of the difference between the present purge concentration learning value Lp(n) and the last purge concentration learning value Lp(n−1) is set to be smaller than when dither control is not performed. Instead, when the injection amount correction request value α is large, the limit value βL may be set to be smaller than when the injection amount correction request value α is small. For example, map data that specifies the relationship between the injection amount correction request value α, which is an input variable, and the limit value βL, which is an output variable, is stored in advance in the ROM 44. Thereafter, the CPU 42 may perform a map calculation of the limit value βL by use of the map data.

In the process of FIG. 3, when dither control is performed, the target purge rate Rp* is set to be smaller than when dither control is not performed. However, there is no limit to such a configuration.

In the above embodiment, under the condition that there is a history showing that the air-fuel ratio learning value LAF has converged after starting the internal combustion engine 10, the target purge rate Rp* is set to a value that is greater than zero. For example, when the internal combustion engine 10 is stopped, the air-fuel ratio learning value LAF may be stored in a nonvolatile memory. Then, after the internal combustion engine 10 is started, the target purge rate Rp* may be set to a value that is greater than zero by use of the air-fuel ratio learning value LAF stored in the nonvolatile memory even if the air-fuel ratio learning value LAF is not updated.

The purge valve 38 is operated to control the purge rate. However, there is no limit to such a configuration. For example, when an adjusting device includes a pump as described below, the purge rate may be controlled by operating the power consumption of the pump.

In the above embodiment, the target value Af* is deviated toward the rich side when dither control is performed. However, the operation amount to compensate for the deviation of the air-fuel ratio Af toward the rich side, which is caused by dither control, by performing feedforward control is not limited to the target value Af*. For example, the operation amount may be set to a correction factor that corrects the base injection amount Qb in accordance with the injection amount correction request value α, and the request injection amount Qd may be determined based on the corrected base injection amount Qb. Also, in this case, there is a possibility that the correction rate δ is deviated due to an error included in the correction factor according to the injection amount correction request value α. Therefore, limiting the update process of the purge concentration learning value Lp is effective when dither control is performed.

The purge valve 38 is shown as an example of an adjusting device that adjusts the amount of fuel vapor flowing into the intake air passage 12 from the canister 36. However, there is no limit to such a configuration. For example, in the internal combustion engine 10 that includes a supercharger described below, the pressure of the intake air passage 12 will not be lower than that of the side of the canister 36. Taking this into consideration, the adjusting device may include a pump in addition to the purge valve 38 so that the pump draws the fluid from the canister 36 and discharges the fluid to the intake air passage 12. In the internal combustion engine including a supercharger, heat is removed from exhaust gases at the supercharger. Thus, the temperature of an exhaust purifying device located at the downstream side of the supercharger will not easily increase. Therefore, use of dither control is particularly effective.

The temperature increase request is not limited to that described in the above embodiment. For example, as described below, in a case in which a GPF is provided at the downstream side of the three-way catalyst 24, the temperature increase request may be a request to increase the temperature of the GPF. Additionally, the temperature increase request may be a temperature increase request of exhaust gases by dither control to increase the temperature of the exhaust passage 22 so that condensed water does not collect on the exhaust passage 22.

The injection amount correction request value α may be variably set based on water temperature THW in addition to the rotation speed NE and the load factor KL. The injection amount correction request value α may be variably set based on only two parameters, i.e., the rotation speed NE and the water temperature THW or the load factor KL and the water temperature THW. The injection amount correction request value α may be variably set based on only one of the above three parameters. Additionally, the rotation speed NE and the load factor KL are used as parameters that specify the operation point of the internal combustion engine 10. However, an accelerator operation amount may be used instead of the load factor KL. The injection amount correction request value α may be variably set based on the intake air amount Ga instead of the rotation speed NE and the load.

The injection amount correction request value α does not necessarily have to be variably set based on the aforementioned parameters.

In the above embodiment, the number of lean combustion cylinders is greater than the number of rich combustion cylinders. However, there is no limit to such a configuration. The number of rich combustion cylinders and the number of lean combustion cylinders may be the same. Additionally, instead of setting all of the cylinders #1 to #4 to either a lean combustion cylinder or a rich combustion cylinder, for example, the air-fuel ratio of one of the cylinders may be set to the target air-fuel ratio. Still additionally, if the amount of air filled in the cylinders is the same in one combustion cycle, the inverse of an average value of a fuel-air ratio does not necessarily have to be a target air-fuel ratio. For example, in a case in which four cylinders are provided as in the above embodiment, the target air-fuel ratio may be set to the inverse of an average value of a fuel-air ratio in five strokes if the amount of air filled in the cylinders is the same. Alternatively, the target air-fuel ratio may be set to the inverse of an average value of a fuel-air ratio in three strokes. In this case, it is preferred that a period during which both a rich combustion cylinder and a lean combustion cylinder exist in one combustion cycle be generated one time or more in at least two combustion cycles. In other words, if the amount of air filled in the cylinders is the same during a predetermined period, it is preferred that the predetermined period be set to two combustion cycles or less when the target air-fuel ratio is set to the inverse of an average value of a fuel-air ratio. Herein, under the condition that the predetermined period is two combustion cycles, in a case in which a rich combustion cylinder exists only one time during two combustion cycles, the order of appearance of a rich combustion cylinder and a lean combustion cylinder is expressed as, for example, "R, L, L, L, L, L, L, L" where R denotes a rich combustion cylinder, and L denotes a lean combustion cylinder. In this case, the order "R, L, L, L" appears in the period of one combustion cycle, which is shorter than the predetermined period. Thus, at least one of the cylinders #1 to #4 is a lean combustion cylinder, and at least a further one of the cylinders is a rich combustion cylinder. If the target air-fuel ratio is set to the inverse of an average value of a fuel-air ratio obtained in a period differing from one combustion cycle, it is desirable that the amount of air that is temporarily drawn by the internal combustion engine in an air intake step and then returns to the intake air passage before the intake valve is closed can be neglected. It is desirable that the low-pass filter M17 be used as a process for outputting a time average value of the air-fuel ratio Afu per predetermined period of time.

The three-way catalyst 24 is shown as an example of the exhaust purifying device that purifies exhaust gases of the plurality of cylinders. However, there is no limit to such a configuration. For example, a gasoline particulate filter (GPF) may be further provided at the downstream side of the three-way catalyst 24. Alternatively, only the GPF may be used as the exhaust purifying device. In that case, it is desirable that an oxygen storing capability be applied to the GPF in order to increase the temperature increase effect by dither control.

The control apparatus is not limited to an apparatus that includes the CPU 42 and the ROM 44 and executes software processes. For example, the control apparatus may include a dedicated hardware circuit (such as ASIC) that performs a hardware process on at least part of elements that undergo software processes in the above embodiment. In other words, the control apparatus only needs to be configured as any one of (a) to (c) described below. (a) The control apparatus includes a processing device that performs all of the above processes in accordance with a program and a program-storing device that stores programs such as a ROM. (b) The control apparatus includes a processing device and a program-storing device that perform part of the above processes in accordance with a program and a dedicated hardware circuit that performs the remaining processes. (c) The control apparatus includes a dedicated hardware circuit that performs all of the above processes. Herein, a plurality of software processing circuits each of which includes the processing device and the program-storing device and a plurality of dedicated hardware circuits may be used. In other words, the above processes only need to be performed by means of a processing circuit that includes at least one of one or more software processing circuits and one or more dedicated hardware circuits.

The internal combustion engine may be a straight-six internal combustion engine besides the four-cylinder internal combustion engine. Additionally, the internal combustion engine may be an internal combustion engine that includes a first exhaust purifying device and a second exhaust purifying device such as a V-type internal combustion engine. The first exhaust purifying device and the second exhaust purifying device purify exhaust gases of different cylinders. The internal combustion engine may be an internal combustion engine including a supercharger. If an internal combustion engine including a supercharger is used, heat is removed from exhaust gases at the supercharger. Thus, the temperature of an exhaust purifying device located at the downstream side of the supercharger will not easily increase. Therefore, use of dither control is particularly effective.

The internal combustion engine 10 may include a fuel injection valve that injects fuel into the intake air passage 12 instead of the fuel injection valve 18 that injects fuel into the combustion chamber 16.

The invention claimed is:

1. A control apparatus for an internal combustion engine including an exhaust purifying device configured to purify an exhaust gas discharged from a plurality of cylinders, a fuel injection valve provided for each of the plurality of cylinders, a canister that collects fuel vapor in a fuel tank, which stores fuel injected by the fuel injection valves, and an adjusting device configured to adjust a flow rate of a fluid from the canister to an intake air passage, wherein the control apparatus comprises a central processing unit and a memory storing one or more control programs, the central processing unit being configured to execute the one or more control programs to perform acts comprising:

a dither control process that operates the fuel injection valves so that at least one of the plurality of cylinders is set as a lean combustion cylinder, which has an air-fuel ratio that is leaner than a theoretical air-fuel ratio, and so that at least a further one of the plurality of cylinders is set as a rich combustion cylinder, which has an air-fuel ratio that is richer than the theoretical air-fuel ratio;

a purge control process that operates the adjusting device to control the flow rate of the fluid from the canister to the intake air passage;

an update process that updates a learning value of a concentration of fuel vapor in the fluid based on a detection value of the air-fuel ratio, the learning value being a correction rate per percentage of a purge rate, the correction rate being a value for correcting a deviation of a base injection amount from an injection amount calculated based on a feedback operation amount, the purge rate being a value obtained by dividing the flow rate of the fluid that flows into the intake air passage from the canister by an intake air amount; and a limit process that limits a change in the learning value updated by the update process to a smaller amount in a second period during which the dither control process is performed as compared to an amount of a change in the learning value in a first period during which the dither control process is not performed.

2. The control apparatus for an internal combustion engine according to claim 1, wherein the central processing unit is further configured to execute the one or more control programs to perform acts comprising:

a base injection amount calculation process that calculates the base injection amount based on an amount of air filled in a combustion chamber of the internal combustion engine;

a decrease correction amount calculation process that calculates a decrease correction amount for a decrease correction of the base injection amount based on the learning value of the concentration of fuel vapor in the fluid and based on the flow rate of the fluid; and a normal operation process that operates the fuel injection valves, when the dither control process is not performed, in accordance with a value in which the base injection amount is corrected by the decrease correction amount.

3. The control apparatus for an internal combustion engine according to claim 2, wherein the central processing unit is further configured to execute the one or more control programs to perform acts comprising:

a feedback process that calculates the feedback operation amount, which is an operation amount for feedback control so that the detection value of the air-fuel ratio reaches a target value, and the update process is a process that uses the feedback operation amount according to the detection value of the air-fuel ratio as an input and, when a decrease correction rate of the base injection amount by the feedback operation amount is large, updates the learning value of the concentration to a greater value than when the decrease correction rate of the base injection amount is small.

4. The control apparatus for an internal combustion engine according to claim 1, wherein the limit process is a process that forbids the update process in the second period.

5. The control apparatus for an internal combustion engine according to claim 1, wherein the limit process is a process that permits the update process in the second period and sets a change per unit time in the learning value updated by the update process to a smaller value in the second period than in the first period.

6. A control apparatus for an internal combustion engine including an exhaust purifying device configured to purify an exhaust gas discharged from a plurality of cylinders, a fuel injection valve provided for each of the plurality of cylinders, a canister that collects fuel vapor in a fuel tank, which stores fuel injected by the fuel injection valves, and an adjusting device configured to adjust a flow rate of a fluid from the canister to an intake air passage, wherein the control apparatus comprises hardware circuitry configured to perform acts comprising:

a dither control process that operates the fuel injection valves so that at least one of the plurality of cylinders is set as a lean combustion cylinder, which has an air-fuel ratio that is leaner than a theoretical air-fuel ratio, and so that at least a further one of the plurality of cylinders is set as a rich combustion cylinder, which has an air-fuel ratio that is richer than the theoretical air-fuel ratio;

a purge control process that operates the adjusting device to control the flow rate of the fluid from the canister to the intake air passage;

an update process that updates a learning value of a concentration of fuel vapor in the fluid based on a detection value of the air-fuel ratio, the learning value being a correction rate per percentage of a purge rate, the correction rate being a value for correcting a deviation of a base injection amount from an injection amount calculated based on a feedback operation amount, the purge rate being a value obtained by dividing the flow rate of the fluid that flows into the intake air passage from the canister by an intake air amount; and a limit process that limits a change in the learning value updated by the update process to a smaller amount in a second period during which the dither control process is performed as compared to an amount of a change in the learning value in a first period during which the dither control process is not performed.

7. A method for controlling an internal combustion engine including an exhaust purifying device configured to purify an exhaust gas discharged from a plurality of cylinders, a fuel injection valve provided for each of the plurality of cylinders, a canister that collects fuel vapor in a fuel tank, which stores fuel injected by the fuel injection valves, and an adjusting device configured to adjust a flow rate of a fluid from the canister to an intake air passage, the method comprising:

operating the fuel injection valves in a dither control process so that at least one of the plurality of cylinders is set as a lean combustion cylinder, which has an air-fuel ratio that is leaner than a theoretical air-fuel ratio, and so that at least a further one of the plurality of cylinders is set as a rich combustion cylinder, which has an air-fuel ratio that is richer than the theoretical air-fuel ratio;

operating the adjusting device to control the flow rate of the fluid from the canister to the intake air passage;

updating a learning value of a concentration of fuel vapor in the fluid based on a detection value of the air-fuel ratio, the learning value being a correction rate per percentage of a purge rate, the correction rate being a value for correcting a deviation of a base injection amount from an injection amount calculated based on a feedback operation amount, the purge rate being a value obtained by dividing the flow rate of the fluid that flows into the intake air passage from the canister by an intake air amount; and limiting a change in the learning value when updating the learning value to a smaller amount in a second period during which the dither control process is performed as compared to an amount of a change in the learning value in a first period during which the dither control process is not performed.

* * * * *